(12) United States Patent
Chen et al.

(10) Patent No.: US 10,750,524 B2
(45) Date of Patent: Aug. 18, 2020

(54) BASE STATION DEVICE, TERMINAL DEVICE, AND TRANSMISSION METHOD

(71) Applicant: FUJITSU LIMITED, Kawasaki-shi, Kanagawa (JP)

(72) Inventors: Hongyang Chen, Kawasaki (JP); Jianming Wu, Kawasaki (JP); Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/295,404

(22) Filed: Mar. 7, 2019

(65) Prior Publication Data

US 2019/0208534 A1 Jul. 4, 2019

Related U.S. Application Data

(63) Continuation of application No. PCT/JP2016/078923, filed on Sep. 29, 2016.

(51) Int. Cl.
| | |
|---|---|
| *H04W 72/12* | (2009.01) |
| *H04W 88/06* | (2009.01) |
| *H04L 27/26* | (2006.01) |
| *H04W 88/08* | (2009.01) |
| *H04L 5/00* | (2006.01) |

(Continued)

(52) U.S. Cl.
CPC ....... *H04W 72/1263* (2013.01); *H04L 5/0053* (2013.01); *H04L 5/0064* (2013.01); *H04L 5/0087* (2013.01); *H04L 27/2607* (2013.01); *H04L 27/2628* (2013.01); *H04W 52/28* (2013.01); *H04W 72/04* (2013.01); *H04W 72/12* (2013.01); *H04W 88/06* (2013.01); *H04W 88/08* (2013.01); *H04L 5/0007* (2013.01); *H04L 27/2602* (2013.01)

(58) Field of Classification Search
CPC . H04W 72/1263; H04W 72/12; H04W 72/04; H04W 52/28; H04W 88/08; H04W 88/06; H04L 27/2628; H04L 27/2607
See application file for complete search history.

(56) References Cited

U.S. PATENT DOCUMENTS 10,420,080 B2 * 9/2019 Yang ................. H04L 5/0092
10,498,484 B2 * 12/2019 Yeo .................... H04L 5/0053
(Continued)

FOREIGN PATENT DOCUMENTS

KR  10-2016-0058693 A   5/2016
WO     2017/195702 A1  11/2017

OTHER PUBLICATIONS

International Search Report with Written Opinion of the International Searching Authority issued by the Japan Patent Office for corresponding International Patent Application No. PCT/JP2016/078923, dated Nov. 8, 2016, with an English translation.

(Continued)

*Primary Examiner* — Min Jung
(74) *Attorney, Agent, or Firm* — Myers Wolin, LLC.

(57) ABSTRACT

A base station device includes: a processor circuitry configured to generate an indication signal; and a transmitter configured to transmit the indication signal to a terminal device. The indication signal indicates that there is no transmission of first data to be scheduled in a resource, and the resource may be assigned second data to be transmitted at low latency.

8 Claims, 11 Drawing Sheets

(51) Int. Cl.
*H04W 72/04* (2009.01)
*H04W 52/28* (2009.01)

(56) References Cited

U.S. PATENT DOCUMENTS

| | | | | |
|---|---|---|---|---|
| 2011/0103290 | A1* | 5/2011 | Suzuki | H04L 5/0023 |
| | | | | 370/312 |
| 2015/0280871 | A1 | 10/2015 | Xu et al. | |
| 2016/0234857 | A1 | 8/2016 | Chen et al. | |
| 2018/0027576 | A1* | 1/2018 | Kowalski | H04W 72/0406 |
| | | | | 370/329 |
| 2018/0035446 | A1* | 2/2018 | Li | H04L 5/14 |
| 2018/0041858 | A1* | 2/2018 | Sheng | H04L 1/0009 |
| 2018/0054285 | A1* | 2/2018 | Chen | H04B 7/0628 |
| 2018/0063865 | A1* | 3/2018 | Islam | H04W 76/27 |
| 2018/0070341 | A1* | 3/2018 | Islam | H04L 1/1887 |
| 2018/0083817 | A1* | 3/2018 | Salem | H04L 27/2602 |
| 2018/0092104 | A1* | 3/2018 | Sheng | H04L 5/0064 |
| 2018/0146492 | A1* | 5/2018 | Luo | H04W 72/10 |
| 2019/0190645 | A1 | 6/2019 | Sano et al. | |
| 2019/0254058 | A1* | 8/2019 | Xie | H04L 1/00 |
| 2019/0312659 | A1* | 10/2019 | Chen | H04L 5/0053 |

OTHER PUBLICATIONS

LG Electronics, "Handling URLLC in new RAT", Agenda Item: 8.1.3.2, 3GPP TSG-RAN WG1 Meeting #86, R1-166886, Gothenburg, Sweden, Aug. 22-26, 2016.

NTT Docomo, Inc., "On co-existence of eMBB and URLLC", Agenda Item: 8.1.8, 3GPP TSG-RAN WG1 Meeting #86, R1-167391, Gothenburg, Sweden, Aug. 22-26, 2018.

Samsung, "Discussion on URLLC support in NR", Agenda Item: 8.1.3.2, 3GPP TSG-RAN WG1 Meeting #86, R1-166759, Gothenburg, Sweden, Aug. 22-26, 2016.

Sharp et al., "Channel coding schemes for eMBB and URLLC Coexistence", Agenda Item: 8.1.4.1, 3GPP TSG-RAN WG1 Meeting #86, R1-167913, Gothenburg, Sweden, Aug. 22-26, 2016.

Intel Corporation, "Discussion on multiplexing of eMBB and URLLC", Agenda Item: 8.1.8, 3GPP TSG-RAN WG1 Meeting #86, R1-167708, Gothenburg, Sweden, Aug. 22-26, 2016.

Zte et al., "Multiplexing of eMBB and URLLC", Agenda Item: 8.1.3, 3GPP TSG-RAN WG1 Meeting #86, R1-166408, Gothenburg, Sweden, Aug. 22-26, 2016.

Notice of Reasons for Refusal issued by Japan Patent Office for corresponding Japanese Patent Application No. 2018-541819, dated Sep. 24, 2019; full English translation attached.

Decision of Refusal issued by Japan Patent Office for corresponding Japanese Patent Application No. 2018-541819, dated Dec. 17, 2019, with an English translation.

Notice of Termination of Reconsideration by Examiners before Appeal Proceedings issued by the Japan Patent Office or corresponding Japanese Patent Application No. 2018-541819, Appeal No. 2020-3671, dated May 12, 2020, with a full English machine translation.

Extended European search report with supplementary European search report and the European search opinion issued by the European Patent Office for corresponding European Patent Application No. 16917711.0-1205, dated Apr. 24, 2020.

Notice of Preliminary Rejection issued by the Korean Intellectual Property Office for corresponding Korean Patent Application No. 10-2019-7008867, dated May 20, 2020, with an English translation.

* cited by examiner

BASE STATION DEVICE, TERMINAL DEVICE, AND TRANSMISSION METHOD

CROSS-REFERENCE TO RELATED APPLICATION

This application is a continuation of International Application No. PCT/JP2016/078923, filed on Sep. 29, 2016, the entire contents of which are incorporated herein by reference.

FIELD

The embodiments discussed herein are related to a base station device, a terminal device, and a transmission method.

BACKGROUND

In recent years, in the $3^{rd}$ Generation Partnership Project (3GPP) that is the standards organization related to radio communication systems, studies have been conducted on the fifth generation mobile communication system (5G). In the fifth generation mobile communication systems, services conforming to eMBB (enhanced mobile broadband), mMTC (massive machine type communications), URLLC (Ultra Reliability and Low Latency Communications), and the like are going to be started.

For example, eMBB responds to a service of transmission of large-volume data, such as moving image data. In contrast, URLLC responds to a service in which high-reliable and low-latency communication is needed, such as automatic operations or telesurgery. In order to implement these services, discussions are actively conducted on how to set communication parameters, such as Transmission Time Interval (TTI), that is the duration of time represented by, for example, flames or subframes.

Specifically, for example, when eMBB data and URLLC data are transmitted by using the same frequency band, it is conceivable to multiplex the eMBB data and the URLLC data by using time-division multiplexing or frequency-division multiplexing. At this time, because a low latency is needed for the URLLC data, a large reduction in TTI of URLLC compared to TTI of eMBB is studied.

Non-Patent Document 1: LG Electronics, "Handling URLLC in new RAT", 3GPP TSG RAN WG1 Meeting #86, R1-166886, August 2016

Non-Patent Document 2: NTT DOCOMO, INC., "On co-existence of eMBB and URLLC", 3GPP TSG RAN WG1 Meeting #86, R1-167391, August 2016

Non-Patent Document 3: Samsung, "Discussion on URLLC support in NR", 3GPP TSG RAN WG1 Meeting #86, R1-166759, August 2016

However, when eMBB data and URLLC data are multiplexed in the same frequency band, there is a problem in that the efficiency of using time and frequency resources is reduced. Specifically, because URLLC data is transmitted to control, for example, automatic operations, URLLC data to be transmitted is not always present and, accordingly, intermittent transmission occurs in URLLC data. Nevertheless, if time and frequency resources are fixedly allocated to URLLC data, the resources allocated to the URLLC data are wasted when URLLC data to be transmitted is not present.

SUMMARY

According to an aspect of an embodiment, a base station device includes: a processor circuitry configured to generate an indication signal; and a transmitter configured to transmit the indication signal to a terminal device. The indication signal indicates that there is no transmission of first data to be scheduled in a resource, and the resource may be assigned second data to be transmitted at low latency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
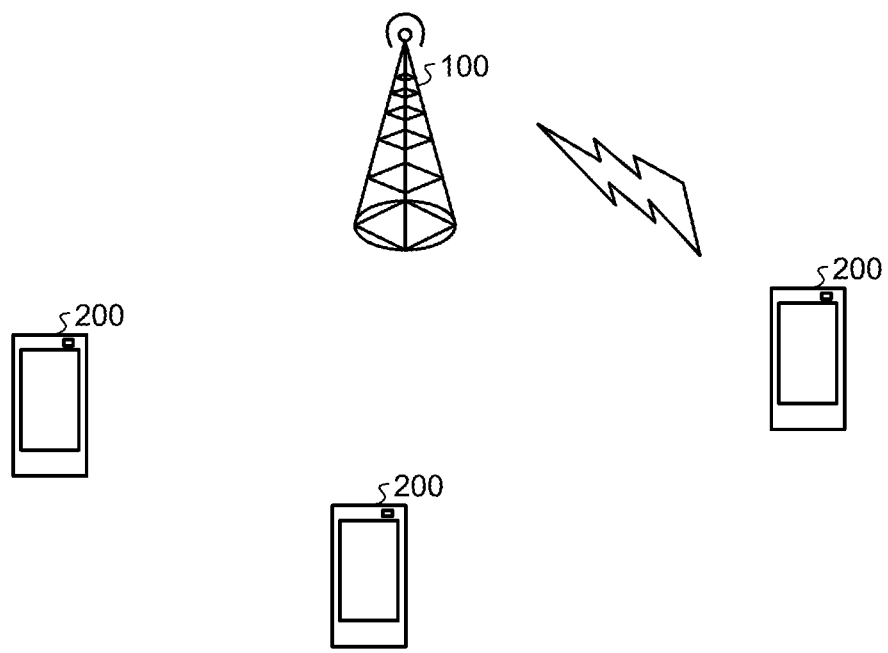
FIG. 1 is a diagram illustrating a configuration of a radio communication system according to a first embodiment.

FIG. 1 is a diagram illustrating a configuration of a radio communication system according to a first embodiment. The radio communication system illustrated in FIG. 1 includes a base station device 100 and a plurality of user terminal devices 200.

The base station device 100 transmits signals including, for example, eMBB data and URLLC data to the user terminal devices 200. Namely, the base station device 100 allocates resources constituted of time and frequency to the eMBB data and the URLLC data addressed to each of the plurality of user terminal devices 200 and then generates a transmission signal.

At this time, the base station device 100 provides an area (hereinafter, referred to as an "URLLC area") that is temporarily reserved, as an area in which URLLC data is to be arranged, in a resource area to which eMBB data is allocated and then allocates, if URLLC data to be transmitted is present, a resource of the URLLC area to the subject URLLC data. Then, the base station device 100 arranges, in the URLLC area, an indication signal indicating whether the resource of the URLLC area has been allocated to the URLLC data.

Thus, if the URLLC data to be transmitted is present, the resource of the URLLC area is allocated to the URLLC data and this state is notified by the indication signal. Furthermore, if the URLLC data to be transmitted is not present, the resource of the URLLC area is allocated to the eMBB data and information indicating that the URLLC data is not transmitted is notified by the indication signal.

Each of the user terminal devices 200 receives a signal including eMBB data and URLLC data that are transmitted from the base station device 100. Specifically, the user terminal devices 200 are classified into devices that use a service related to eMBB, devices that use a service related to URLLC, and devices that use services related to both eMBB and URLLC. Each of the user terminal devices 200 that uses the service related to eMBB specifies, based on a control signal and an indication signal included in a reception signal, eMBB data addressed to the own device and then demodulates the eMBB data.

Furthermore, each of the user terminal devices 200 that uses a service related to URLLC determines, based on the indication signal included in the reception signal, whether URLLC data is included in the reception signal and then demodulates, based on the control signal if the URLLC data is included, the URLLC data addressed to the own device. Furthermore, each of the user terminal devices 200 that uses a service related to both eMBB and URLLC demodulates eMBB data and then demodulates URLLC data in a similar manner described above.

Figure 2:
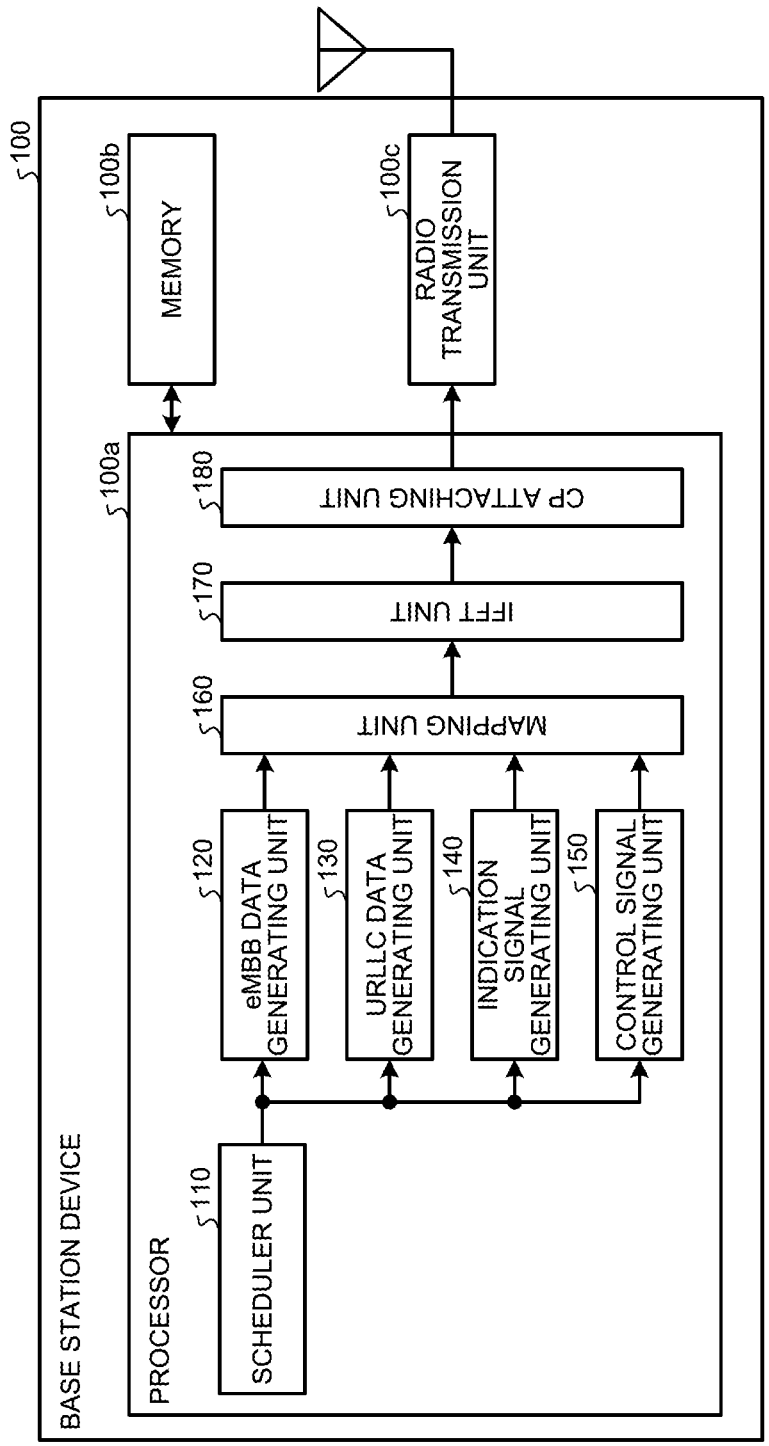
FIG. 2 is a block diagram illustrating a configuration of a base station device according to the first embodiment.

FIG. 2 is a block diagram illustrating a configuration of the base station device 100 according to the first embodiment. The base station device 100 illustrated in FIG. 2 includes a processor 100*a*, a memory 100*b*, and a radio transmission unit 100*c*.

The processor 100*a* includes, for example, a central processing unit (CPU), a field programmable gate array (FPGA), or a digital signal processor (DSP), or the like and performs overall control of the base station device 100. Specifically, the processor 100*a* includes a scheduler unit 110, an eMBB data generating unit 120, an URLLC data generating unit 130, an indication signal generating unit 140, a control signal generating unit 150, a mapping unit 160, an inverse Fast Fourier transformation (IFFT) unit 170, and a cyclic prefix (CP) attaching unit 180.

The scheduler unit 110 performs scheduling that allocates resources to eMBB data and URLLC data addressed to the plurality of user terminal devices 200. Specifically, the scheduler unit 110 estimates, for example, a channel state between each of the plurality of user terminal devices 200 and performs eMBB scheduling that decides, in accordance with the channel state, a resource to be allocated to eMBB data that is addressed to each of the user terminal devices 200. Furthermore, the scheduler unit 110 determines whether URLLC data addressed to one of the user terminal devices 200 is generated and performs, if the URLLC data has been generated, URLLC scheduling that decides a resource to be allocated to the URLLC data.

The scheduler unit 110 arranges, at the time of URLLC scheduling, URLLC data in an URLLC area that is provided in the resource area to which the eMBB data is allocated. Namely, the resource for a transmission signal has an eMBB control channel area in which an eMBB control signal is arranged and an eMBB data area in which eMBB data is arranged; however, an URLLC area that is temporarily reserved as an area in which the URLLC data is to be arranged is provided in the eMBB data area. Thus, if URLLC data to be transmitted is generated, the scheduler unit 110 allocates a resource to be used for the URLLC area to the URLLC data.

The eMBB data generating unit 120 generates, in accordance with eMBB scheduling performed by the scheduler unit 110, eMBB data to be addressed to each of the user terminal devices 200. Namely, the eMBB data generating unit 120 encodes and modulates the eMBB data addressed to each of the user terminal devices 200.

The URLLC data generating unit 130 generates, in accordance with URLLC scheduling performed by the scheduler unit 110, URLLC data addressed to each of the user terminal devices 200. Namely, the URLLC data generating unit 130 encodes and modulates the URLLC data addressed to each of the user terminal devices 200.

The indication signal generating unit 140 generates, in accordance with the result of determination whether URLLC scheduling has been performed by the scheduler unit 110, an indication signal indicating whether URLLC data is present. Namely, if URLLC data to be transmitted is not present and if the URLLC data is not arranged in an URLLC area, the indication signal generating unit 140 generates an indication signal indicating that URLLC data is not present. Furthermore, if URLLC data to be transmitted is present and if the URLLC data is arranged in an URLLC area, the indication signal generating unit 140 indicates that the URLLC data to be transmitted is present and then generates an indication signal that specifies a resource to be allocated to the URLLC data that is addressed to each of the user terminal devices 200. Namely, the indication signal generating unit 140 generates an indication signal that includes 1 bit indicating whether URLLC data is present and N bits (N is an integer equal to or greater than two) that specifies, in a case where URLLC data is present, a resource to be allocated to the subject URLLC data.

The control signal generating unit 150 generates a control signal of each of eMBB and URLLC in accordance with eMBB scheduling and URLLC scheduling performed by the scheduler unit 110. Specifically, the control signal generating unit 150 generates an eMBB control signal including information for specifying a resource to be allocated to eMBB data addressed to each of the user terminal devices 200 and information indicating a coding rate of eMBB data, a modulation scheme of eMBB data, transmission power of eMBB data, and the like. Furthermore, if URLLC data is arranged in an URLLC area, the control signal generating unit 150 generates an URLLC control signal including information indicating a coding rate, a modulation scheme of URLLC data, transmission power of URLLC data, and the like.

The mapping unit 160 maps eMBB data, URLLC data, an indication signal, and a control signal and generates a transmission signal. Namely, the mapping unit 160 arranges the eMBB data, the URLLC data, the indication signal, and the control signal in the resources in accordance with scheduling.

Figure 3:
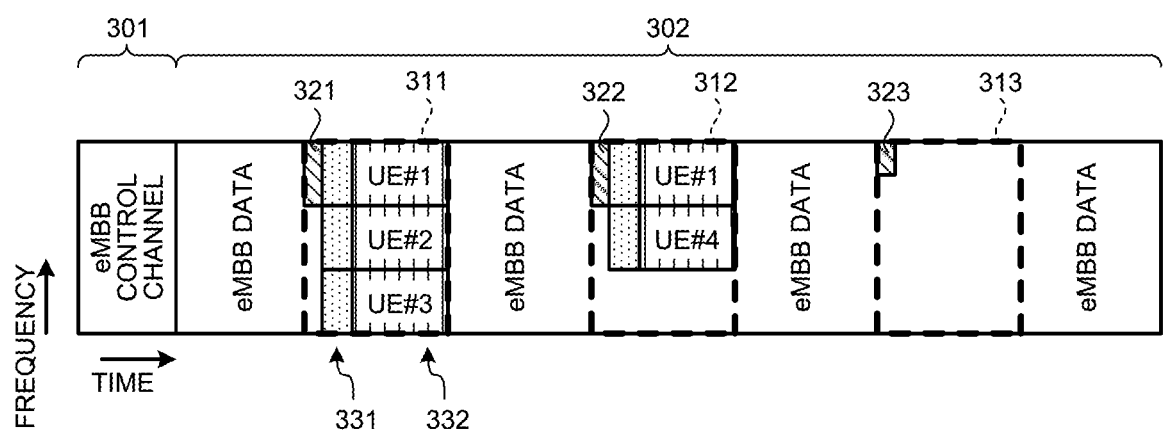
FIG. 3 is a diagram illustrating a specific example of resource allocation according to the first embodiment.

Specifically, the mapping unit 160 generates a transmission signal in which the resources illustrated in, for example, FIG. 3 have been allocated. FIG. 3 illustrates a specific example of allocating resources having, for example, a frequency bandwidth corresponding to the number of predetermined subcarriers and duration of time corresponding to a single TTI. As illustrated in FIG. 3, the resource of this TTI includes an eMBB control channel area 301 and an eMBB data area 302. Then, URLLC areas 311 to 313 that are temporarily reserved as areas in each of which URLLC data is to be arranged is provided in the eMBB data area 302. In the URLLC areas 311 to 313, indication signals 321 to 323, an URLLC control signal 331 and URLLC data 332 are mapped.

The mapping unit 160 maps the eMBB control signal generated by the control signal generating unit 150 to the eMBB control channel area 301 and maps the eMBB data generated by the eMBB data generating unit 120 to the eMBB data area 302. Furthermore, if URLLC scheduling has been performed, the mapping unit 160 maps both of the URLLC control signal 331 generated by the control signal generating unit 150 and the URLLC data 332 generated by the URLLC data generating unit 130 onto the URLLC areas 311 to 313. Furthermore, the mapping unit 160 maps the indication signals 321 to 323 generated by the indication signal generating unit 140 onto the URLLC areas 311 to 313, respectively.

At this time, as illustrated in FIG. 3, because the URLLC data has been arranged in the URLLC areas 311 and 312, each of the indication signals 321 and 322 includes 1 bit indicating that URLLC data is present and N bits specifying URLLC data addressed to each of the user terminal devices 200. Namely, for example, because three pieces of URLLC data addressed to the user terminal devices 200 of UEs #1 to #3 are arranged in the URLLC area 311, the indication signal 321 includes N bits that specify the frequency bands of the corresponding pieces of URLLC data addressed to the UEs #1 to #3. In contrast, because URLLC data is not arranged in the URLLC area 313, the indication signal 323 includes only 1 bit indicating that URLLC data is not present.

Furthermore, in the URLLC area 312, because URLLC data is mapped to a part of the URLLC area 312, eMBB data is mapped in the rest of the area. Similarly, in the URLLC area 313, because URLLC data is not mapped, the eMBB data is mapped in the entire of the URLLC area 313. In this way, if URLLC data to be transmitted is not present, because eMBB data is mapped to the URLLC areas 311 to 313, it is possible to effectively use the resources. In particular, because eMBB data is arranged in free areas in the URLLC areas 311 to 313, it is possible to allocate the maximum amount of resources to eMBB data and thus it is possible to increase the capacity based on eMBB.

A description will be given here by referring back to FIG. 2. The IFFT unit 170 performs inverse Fast Fourier transformation on the transmission signal generated by the mapping unit 160 and generates a transmission signal in time domain. Then, the IFFT unit 170 outputs the transmission signal to the CP attaching unit 180.

The CP attaching unit 180 attaches, in units of symbols, CP to the transmission signal output from the IFFT unit 170. Then, the CP attaching unit 180 outputs, to the radio transmission unit 100c, the transmission signal to which the CP has been attached.

The memory 100b includes, for example, a random access memory (RAM), a read only memory (ROM), or the like and stores various kinds of information when a process is performed by the processor 100a.

The radio transmission unit 100c performs, on the transmission signal output from the CP attaching unit 180, a radio transmission process, such as digital/analog (D/A) conversion and up-conversion. Then, the radio transmission unit 100c transmits the transmission signal via an antenna.

Figure 4:
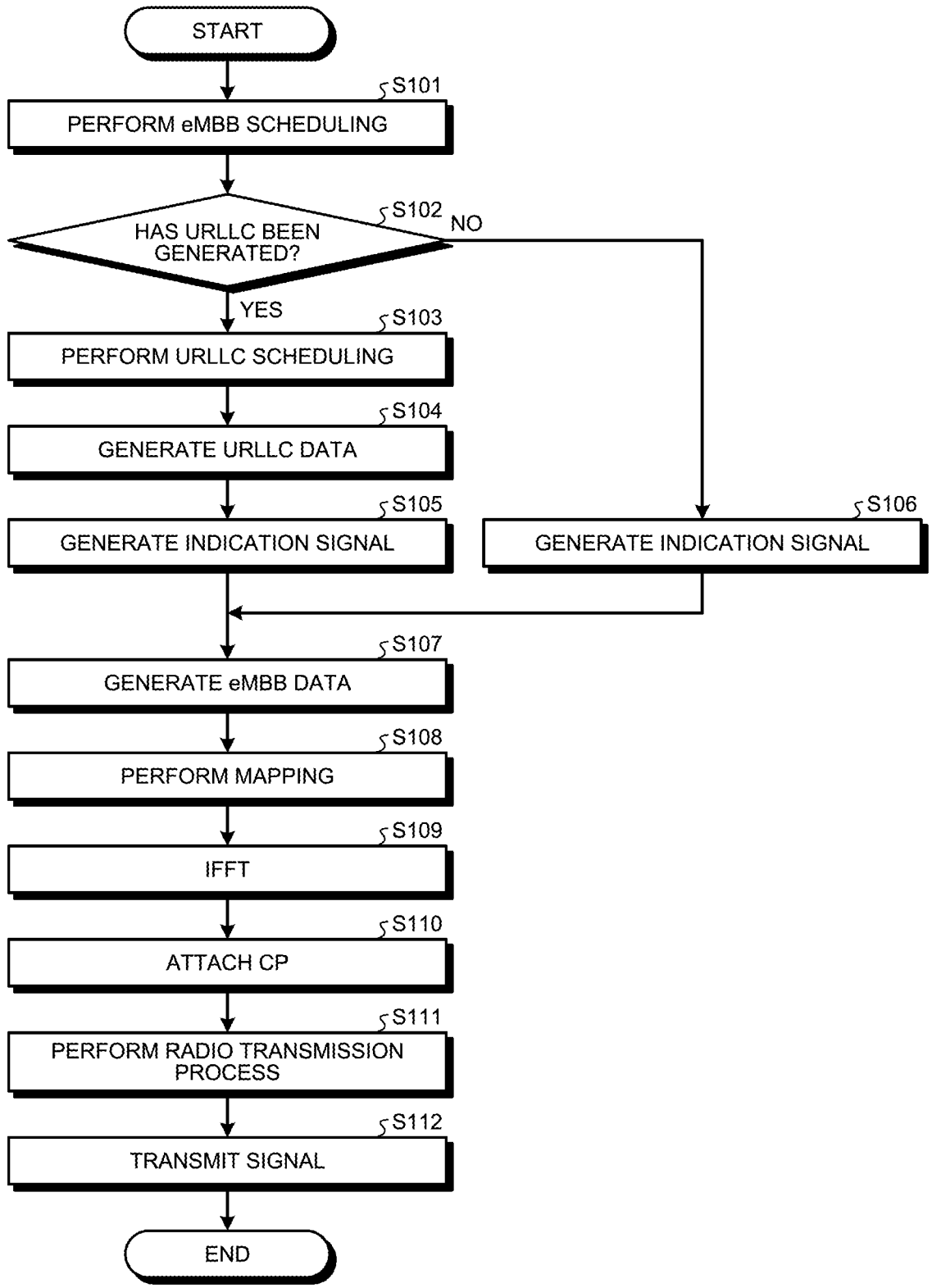
FIG. 4 is a flowchart illustrating a transmission process according to the first embodiment.

In the following, a transmission process performed by the base station device 100 having configuration described above will be described with reference to the flowchart illustrated in FIG. 4.

First, the scheduler unit 110 performs eMBB scheduling in which the resource to be allocated to the eMBB data addressed to each of the user terminal devices 200, a coding rate, and a modulation scheme are decided (Step S101). The eMBB scheduling mentioned here is performed based on, for example, a channel state of a downlink reported from each of the user terminal devices 200. In eMBB scheduling, pieces of eMBB data addressed to each of the user terminal devices 200 are arranged in the eMBB data area in each TTI.

Furthermore, it is determined, by the scheduler unit 110, whether URLLC data to be addressed to one of the user terminal devices 200 has been generated (Step S102). Based on this determination result, if URLLC data to be transmitted is generated (Yes at Step S102), the URLLC scheduling for deciding a resource to be allocated to the URLLC data, a coding rate, and a modulation scheme is performed by the scheduler unit 110 (Step S103). The URLLC scheduling is performed based on, for example, a channel state of a downlink reported from each of the user terminal devices 200. In URLLC scheduling, pieces of URLLC data addressed to the corresponding user terminal devices 200 are arranged in the URLLC areas provided in the eMBB data area in each TTI.

Then, the result of scheduling is notified to the eMBB data generating unit 120, the URLLC data generating unit 130, the indication signal generating unit 140, and the control signal generating unit 150 and then pieces of URLLC data to be arranged in the URLLC areas are generated by the URLLC data generating unit 130 (Step S104). Namely, URLLC data is encoded and modulated by the URLLC data generating unit 130 by using the coding rate and the modulation scheme decided by the URLLC scheduling. Furthermore, an indication signal that indicates that URLLC data is present and that specifies the resource of the URLLC area that has been allocated to the URLLC data that is addressed to each of the user terminal devices 200 is generated by the indication signal generating unit 140 (Step S105).

In contrast, based on the result of determination obtained at Step S102, if URLLC data to be transmitted is not generated (No at Step S102), the result of the eMBB scheduling is notified to the eMBB data generating unit 120, the indication signal generating unit 140, and the control signal generating unit 150. Then, an indication signal indicating that URLLC data is not present is generated by the indication signal generating unit 140 (Step S106).

Furthermore, regardless whether URLLC data is present, eMBB data to be arranged in the eMBB data area is generated by the eMBB data generating unit 120 (Step S107). Namely, eMBB data is encoded and modulated by the eMBB data generating unit 120 by using the coding rate and the modulation scheme decided by the eMBB scheduling.

Furthermore, if URLLC data is arranged in an URLLC area, transmission of eMBB data that was scheduled to be arranged in this area may also be stopped. Furthermore, it is possible to orthogonalize URLLC data and eMBB data by using different codes or sequences (for example, Zadoff-Chu sequence) and arrange the URLLC data and the eMBB data in the same area. When arranging the URLLC data and the eMBB data in the same area, these pieces of data interfere with each other; however, it is possible to reduce interference by using a technology, such as minimum mean square error-interference rejection combining (MMSE-IRC), symbol level interference cancellation (SLIC), and interference measurement (interference aware detection).

If eMBB data has been generated, the resource that is located in the eMBB data area allocated to the eMBB data addressed to each of the user terminal devices 200 is specified by the control signal generating unit 150 and a control signal that notifies of the coding rate of the eMBB data, the modulation scheme of the eMBB data, the transmission power of the eMBB data, and the like is generated by the control signal generating unit 150. Furthermore, if URLLC data has been generated, a control signal that notifies of the coding rate of the URLLC data, the modulation scheme of the URLLC data, the transmission power of the URLLC data, and the like is generated by the control signal generating unit 150.

Then, the eMBB data, the URLLC data, the indication signal, and the control signal are mapped to each of the areas in TTI by the mapping unit 160 (Step S108). Namely, as illustrated in FIG. 3, the eMBB control signal is mapped to the eMBB control channel area 301 and the eMBB data is mapped to the eMBB data area 302. Furthermore, if URLLC data is generated, the URLLC control signal and the URLLC data are mapped to the URLLC areas 311 to 313. Then, an indication signal indicating whether URLLC data is present is mapped to each of the URLLC areas 311 to 313. Consequently, a transmission signal is generated.

The transmission signal is subjected to inverse Fast Fourier transformation by the IFFT unit 170 (Step S109) and transformed to a transmission signal in time domain. Then, a CP is attached, in units of symbols, to the transmission signal by the CP attaching unit 180 (Step S110) and a radio transmission process is performed on the transmission signal by the radio transmission unit 100c (Step S111). Thereafter, the transmission signal is transmitted to the user terminal device 200 via the antenna (Step S112).

As described above, an URLLC area that is used to arrange URLLC data is provided in the eMBB; if URLLC data is present, the URLLC data is arranged in the URLLC area; and if URLLC data is not present, eMBB data is arranged in the URLLC area. Then, an indication signal indicating whether the URLLC data has been arranged in the URLLC area is arranged in each of the URLLC areas. Consequently, if URLLC data is generated, it is possible to transmit the URLLC data in low latency, whereas, if the URLLC data is not generated, it is possible to use the resource of the URLLC area in order to transmit the eMBB data. As the result, regardless whether URLLC data is present, it is possible to prevent the resources from being wasted and thus it is possible to efficiently use the resources.

Figure 5:
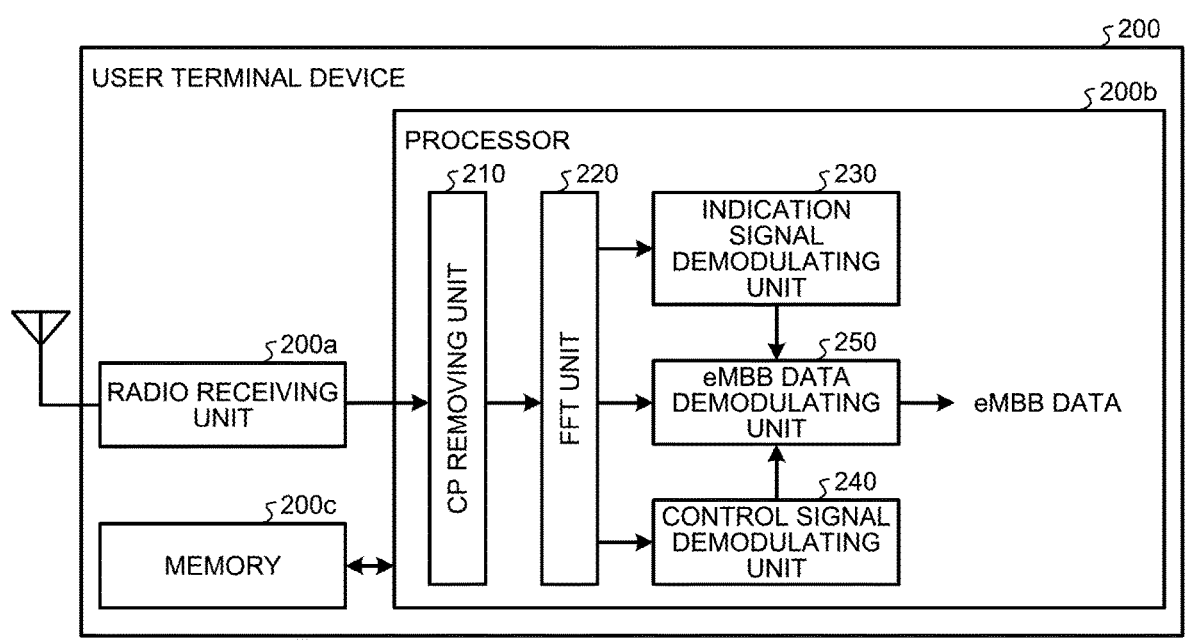
FIG. 5 is a block diagram illustrating a configuration of a user terminal device according to the first embodiment.

In the following, a configuration of the user terminal device 200 will be described. FIG. 5 is a block diagram illustrating a configuration of the user terminal device 200 according to the first embodiment. The user terminal device 200 illustrated in FIG. 5 is a user terminal device that uses a service related to eMBB and includes a radio receiving unit 200a, a processor 200b, and a memory 200c.

The radio receiving unit 200a receives a signal via an antenna and performs, on a reception signal, a radio reception process, such as down-conversion, and analog/digital (A/D) conversion. Then, the radio receiving unit 200a outputs the reception signal to the processor 200b.

The processor 200b includes, for example, a CPU, an FPGA, a DSP, or the like and performs overall control of the user terminal device 200. Specifically, the processor 200b includes a CP removing unit 210, a fast Fourier transformation (FFT) unit 220, an indication signal demodulating unit 230, a control signal demodulating unit 240, and an eMBB data demodulating unit 250.

The CP removing unit 210 removes a CP attached, in units of symbols, to a reception signal. Then, the CP removing unit 210 outputs, to the FFT unit 220, a reception signal from which the CP has been removed.

The FFT unit 220 performs fast Fourier transformation on the reception signal output form the CP removing unit 210 and transforms the signal to a reception signal in frequency domain. Then, the FFT unit 220 outputs the reception signal to the indication signal demodulating unit 230, the control signal demodulating unit 240, and the eMBB data demodulating unit 250.

The indication signal demodulating unit 230 demodulates the indication signals arranged in the URLLC area in the reception signal. Namely, because the positions of the indication signals in the URLLC area and the URLLC area are already known, the indication signal demodulating unit 230 demodulates the indication signal in each of the URLLC areas. Consequently, the indication signal demodulating unit 230 grasps whether URLLC data is included in each of the URLLC areas. Furthermore, if URLLC data is included in an URLLC area, the indication signal demodulating unit 230 specifies, based on the indication signal, the resource allocated to the URLLC data.

The control signal demodulating unit 240 demodulates the control signal arranged in the eMBB control channel area in the reception signal. Namely, the control signal demodulating unit 240 demodulates the eMBB control signal and acquires information on the resource allocated to the eMBB data that is addressed to the own device and information on the coding rate of the eMBB data, the modulation scheme of the eMBB data, and the like.

The eMBB data demodulating unit 250 demodulates the eMBB data arranged in the eMBB data area in the reception signal. At this time, the eMBB data demodulating unit 250 excludes, from the eMBB data area based on the demodulation result of the indication signal, the area in which the URLLC data has been arranged and specifies, from the eMBB data area in which the URLLC data has been excluded and based on the demodulation result of the control signal, the resource of the eMBB data that is addressed to the own device. Then, the eMBB data demodulating unit 250 demodulates the eMBB data addressed to the own device based on the coding rate, the modulation scheme, and the like indicated by the control signal. Furthermore, if the eMBB data and the URLLC data are orthogonalized by using different codes or sequences, the eMBB data demodulating unit 250 does not need to exclude, from the eMBB data area, the area in which the URLLC data has been arranged. This is because that, if the eMBB data and the URLLC data are orthogonalized by codes or sequences, eMBB data is multiplexed, by using another code or sequence, in the time domain and the frequency domain in which the URLLC data is arranged.

Figure 6:
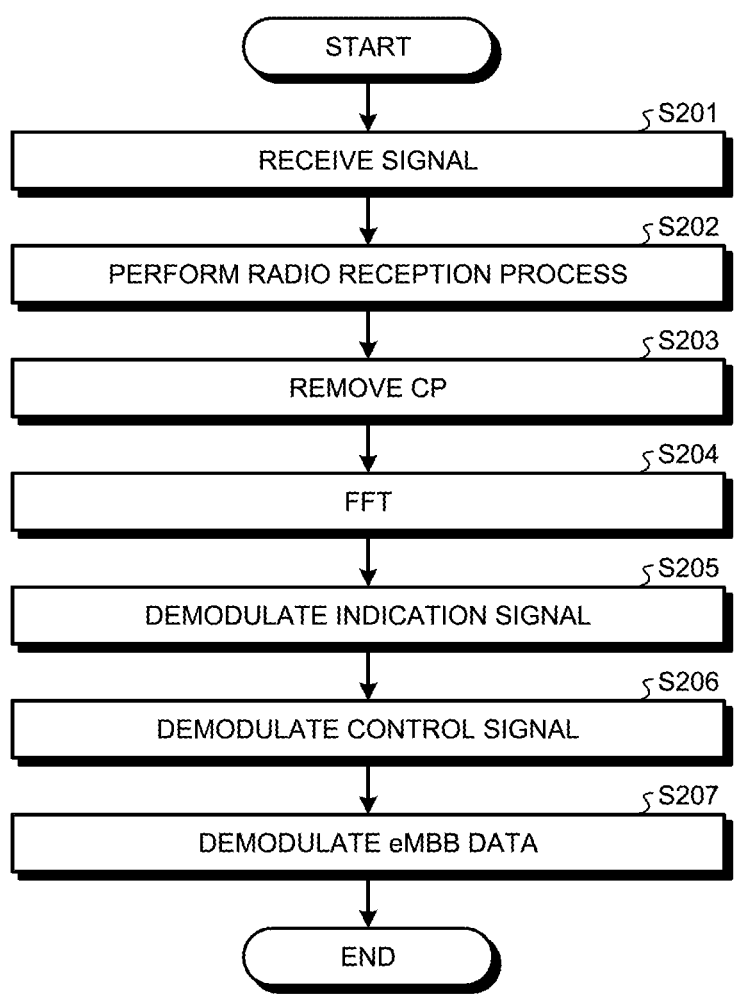
FIG. 6 is a flowchart illustrating a reception process according to the first embodiment.

In the following, a reception process performed by the user terminal device 200 according to eMBB configured described above will be described with reference to the flowchart illustrated in FIG. 6.

The signal from the base station device 100 is received via the antenna (Step S201) and a radio reception process is performed on the reception signal by the radio receiving unit 200a (Step S202). Then, the CP attached to the reception signal in units of symbols is removed by the CP removing unit 210 (Step S203) the reception signal is subjected to fast Fourier transformation by the FFT unit 220 (Step S204), thereby a reception signal in frequency domain is obtained.

Because an URLLC area is provided in an eMBB data area in a reception signal and the resource of the URLLC area is already known, the indication signal arranged in the URLLC area is demodulated by the indication signal demodulating unit 230 (Step S205). Consequently, it is determined whether URLLC data is included in the URLLC area and, if the URLLC data is included, the position of the URLLC data in the URLLC area is specified. In other words, the area that is except for the resource allocated to the URLLC data and in which the eMBB data is actually arranged is specified in the eMBB data area.

Furthermore, the control signal arranged in the eMBB control channel area in the reception signal is demodulated by the control signal demodulating unit 240 (Step S206); the resource allocated to the eMBB data addressed to the own devices is specified; and the coding rate of the eMBB data, the modulation scheme of the eMBB data, and the like are specified. Consequently, the eMBB data addressed to the own device is acquired from the reception signal and is demodulated by the eMBB data demodulating unit 250 (Step S207). At this time, based on the demodulation result of the indication signal, the eMBB data addressed to the own device may also be acquired from the area in which the resource allocated to the URLLC data has been removed. Furthermore, if the URLLC data and the eMBB data are orthogonalized by using different codes or sequences, the eMBB data addressed to the own device may also be acquired from the entire eMBB data area including the resource that has been allocated to the URLLC data.

Figure 7:
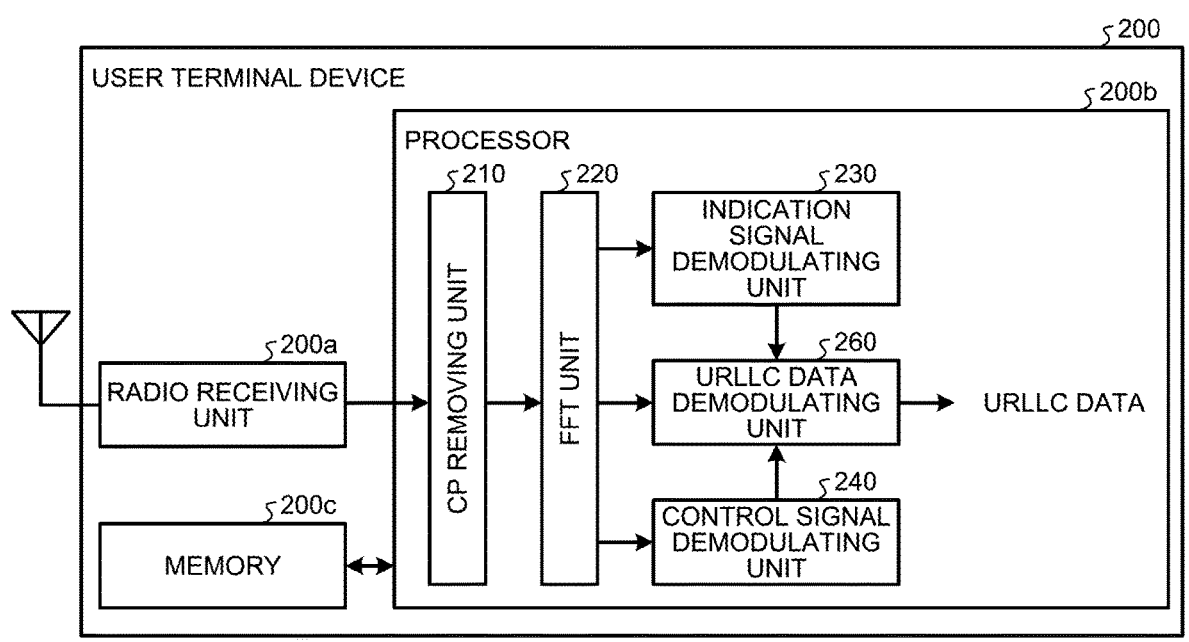
FIG. 7 is a block diagram illustrating a configuration of another user terminal device according to the first embodiment.

FIG. 7 is a block diagram illustrating a configuration of the other user terminal device 200 according to the first embodiment. In FIG. 7, components having the same configuration as those illustrated in FIG. 5 are assigned the same reference numerals and descriptions thereof in detail will be omitted. The user terminal device 200 illustrated in FIG. 7 is a user terminal device that uses a service related to URLLC and includes, similarly to the user terminal device 200 illustrated in FIG. 5, the radio receiving unit 200a, the processor 200b, and the memory 200c. However, the processor 200b in the user terminal device 200 illustrated in FIG. 7 includes, instead of the eMBB data demodulating unit 250 illustrated in FIG. 5, an URLLC data demodulating unit 260.

If the URLLC data demodulating unit 260 determines that, based on the demodulation result of the indication signal, the URLLC data addressed to the own device is included in the reception signal, the URLLC data demodulating unit 260 demodulates the URLLC data that is addressed to the own device and that is arranged in the URLLC area in the reception signal. At this time, the URLLC data demodulating unit 260 specifies, from the URLLC area based on the demodulation result of the indication signal, the resource for the URLLC data addressed to the own device. Then, the URLLC data demodulating unit 260 demodulates the URLLC data addressed to the own device based on the coding rate, the modulation scheme, and the like indicated by the URLLC control signal that is demodulated by the control signal demodulating unit 240.

Figure 8:
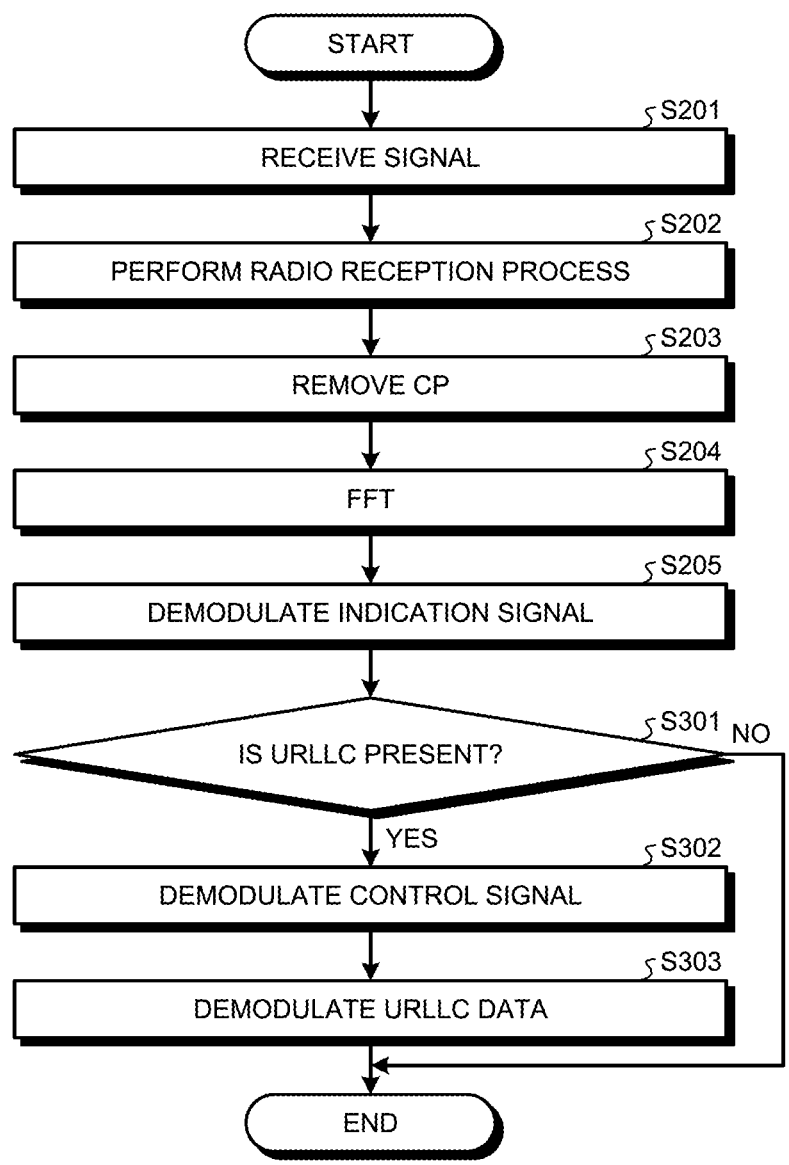
FIG. 8 is a flowchart illustrating another reception process according to the first embodiment.

In the following, a reception process performed by the user terminal device 200 according to URLLC configured described above will be described with reference to the flowchart illustrated in FIG. 8. In FIG. 8, the same processes as those illustrated in FIG. 6 are assigned the same reference numerals and descriptions thereof in detail will be omitted.

Regarding the signal transmitted from the base station device 100, a reception signal in the frequency domain is obtained from an antenna via the radio receiving unit 200a, the CP removing unit 210, and the FFT unit 220 (Steps S201 to S204). Then, the indication signal arranged in the URLLC area in the reception signal is demodulated by the indication signal demodulating unit 230 (Step S205) and it is determined whether the URLLC data is included in the URLLC area (Step S301).

If the URLLC data is not included in the URLLC area (No at Step S301), the process is ended because the URLLC data addressed to the own device is not present. In contrast, if the URLLC data is included in the URLLC area (Yes at Step S301), the URLLC control signal is demodulated by the control signal demodulating unit 240 (Step S302). Namely, because the resources allocated to the control signal and the URLLC data addressed to the own device are specified based on the demodulation result of the indication signal, the URLLC control signal addressed to the own device is demodulated by the control signal demodulating unit 240. Consequently, the coding rate, the modulation scheme, or the like of the URLLC data addressed to the own device are specified.

Furthermore, the URLLC data addressed to the own device is acquired, by the URLLC data demodulating unit 260 based on the demodulation result of the indication signal, from the reception signal and the URLLC data is demodulated based on the demodulation result of the control signal (Step S303).

As described above, according to the embodiment, the URLLC area that is temporarily reserved as an area in which the URLLC data is arranged is provided in the eMBB data area and, if URLLC data is generated, the URLLC data is transmitted by using the resource of the URLLC area. Furthermore, an indication signal indicating whether the URLLC data is present is arranged in the URLLC area. Consequently, if URLLC data is generated, it is possible to promptly transmit the URLLC data without any delay and, if URLLC data is not generated, it is possible to transmit the eMBB data by using the resource of the URLLC area. Furthermore, the user terminal device on the reception side can grasp whether the URLLC data is present based on the indication signal and thus reliably acquire the URLLC data to be addressed to the own device from the reception signal. As the result, it is possible to efficiently use the resources while maintaining high reliability and low latency of the URLLC data.

Furthermore, in the first embodiment, the user terminal devices 200 related to eMBB and the user terminal devices 200 related to URLLC are separately described; however, the single user terminal device 200 may also demodulate both of the eMBB data and the URLLC data. In this case, the processor 200b in the user terminal device 200 includes both of the eMBB data demodulating unit 250 illustrated in FIG. 5 and the URLLC data demodulating unit 260 illustrated in FIG. 7.

Furthermore, in the first embodiment, the URLLC area is provided in the eMBB data area; however, the entire eMBB data area may also be the URLLC area. Namely, for example, as illustrated in FIG. 9, a single TTI is divided into a plurality of short TTIs (hereinafter, referred to as a "short TTI") and all of the short TTIs except for the short TTI that includes the eMBB control channel may also be used as URLLC areas 341.

Figure 9:
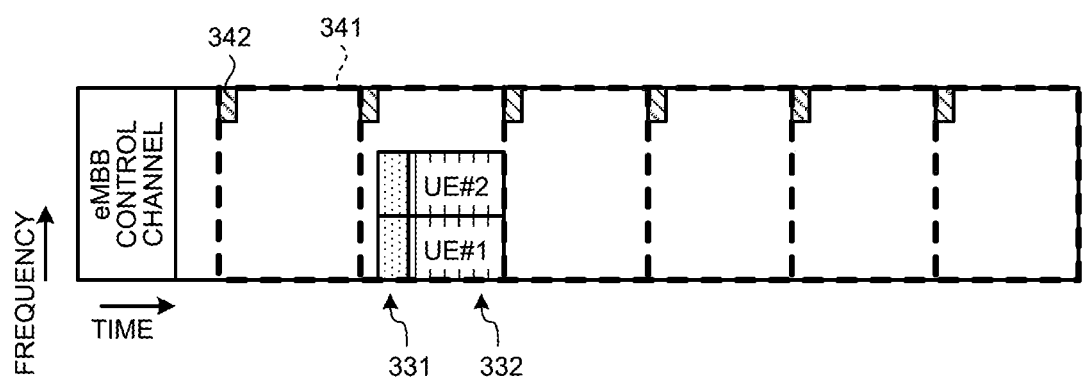
FIG. 9 is a diagram illustrating another specific example of resource allocation according to the first embodiment.

Furthermore, as illustrated in FIG. 9, an indication signal 342 arranged in each of the URLLC areas 341 may also be a 1-bit signal indicating whether the URLLC data is included in each of the URLLC areas 341. In this case, the information that specifies the resource allocated to the URLLC data 332 addressed to each of the user terminal devices 200 is included in the URLLC control signal 331.

[b] Second Embodiment

The characteristic of a second embodiment is that, if URLLC data is included in a reception signal, a user terminal device estimates transmission power for each subcarrier and specifies, based on the transmission power, a subcarrier including the URLLC data.

The configuration of the radio communication system and the base station device 100 according to the second embodiment is the same as that of the first embodiment (FIGS. 1 and 2); therefore, descriptions thereof will be omitted. However, the base station device 100 controls transmission power of the eMBB data and the URLLC data and transmits the URLLC data, in which high reliability is requested, by using transmission power that is greater than that of the eMBB data. Specifically, when the mapping unit 160 arranges URLLC data in an URLLC area, the mapping unit 160 sets the transmission power of the subcarrier in which the URLLC data is to be arranged larger than the transmission power of the subcarrier in which the eMBB data is to be arranged. Thus, if the URLLC data is arranged in an URLLC area and is transmitted, the transmission power of the subcarrier in which URLLC data is arranged is larger than the transmission power of the subcarrier in which the eMBB data is arranged.

Figure 10:
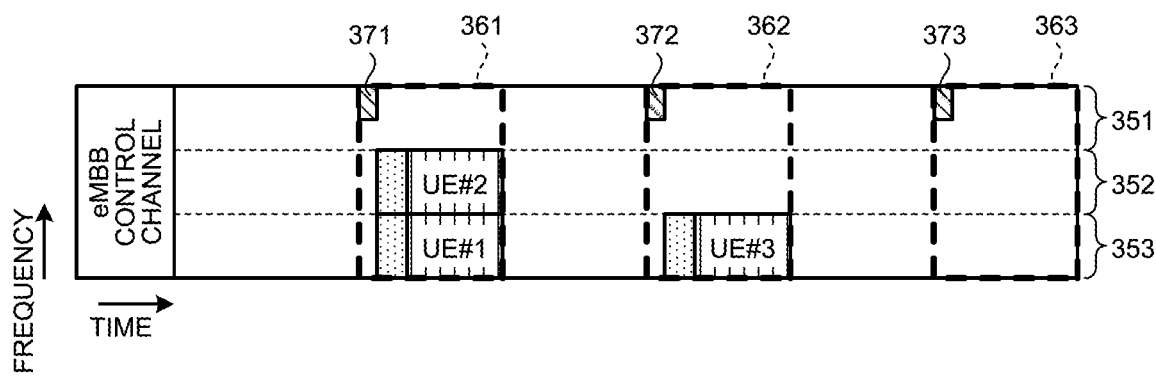
FIG. 10 is a diagram illustrating a specific example of resource allocation according to a second embodiment.

FIG. 10 is a diagram illustrating a specific example of resource allocation according to the second embodiment. The resource illustrated in FIG. 10 has subcarriers 351 to 353 and an eMBB control channel area is provided at the top of the resource. Furthermore, the areas other than the eMBB control channel area are eMBB data areas; however, in the eMBB data area, URLLC areas 361 to 363 temporarily reserved as the areas for arranging URLLC data is provided. In the URLLC areas 361 to 363, indication signals 371 to 373 are mapped and the URLLC control signal and URLLC data are mapped onto the subcarriers 351 to 353 as units.

Specifically, for example, in the URLLC area 361, the URLLC data addressed to the user terminal device UE #2 is mapped onto a subcarrier 352 and the URLLC data addressed to the user terminal device UE #1 is mapped onto the subcarrier 353. Furthermore, for example, in the URLLC area 362, the URLLC data addressed to the user terminal device UE #3 is mapped onto the subcarrier 353.

Here, because the URLLC data is data in which high reliability is requested, the transmission power of the URLLC data is larger than that of the eMBB data. Thus, for example, in the URLLC area 361, the transmission power of the subcarriers 352 and 353 in each of which the URLLC data is mapped is larger than the transmission power of the subcarrier 351 in which the eMBB data is mapped. Similarly, for example, in the URLLC area 362, the transmission power of the subcarrier 353 in which the URLLC data is mapped is larger than the transmission power of the subcarriers 351 and 352 in each of which the eMBB data is mapped.

Namely, in each of the URLLC areas 361 to 363, based on the transmission power for each subcarrier, it is possible to determine which one of the pieces of the eMBB data and URLLC data is mapped in the subcarriers 351 to 353. Therefore, each of the indication signals 371 to 373 is a 1-bit signal indicating whether the URLLC data is included in each of the URLLC areas 361 to 363 and thus information for specifying a subcarrier in which the URLLC data is to be mapped is not included in the indication signals 371 to 373.

Figure 11:
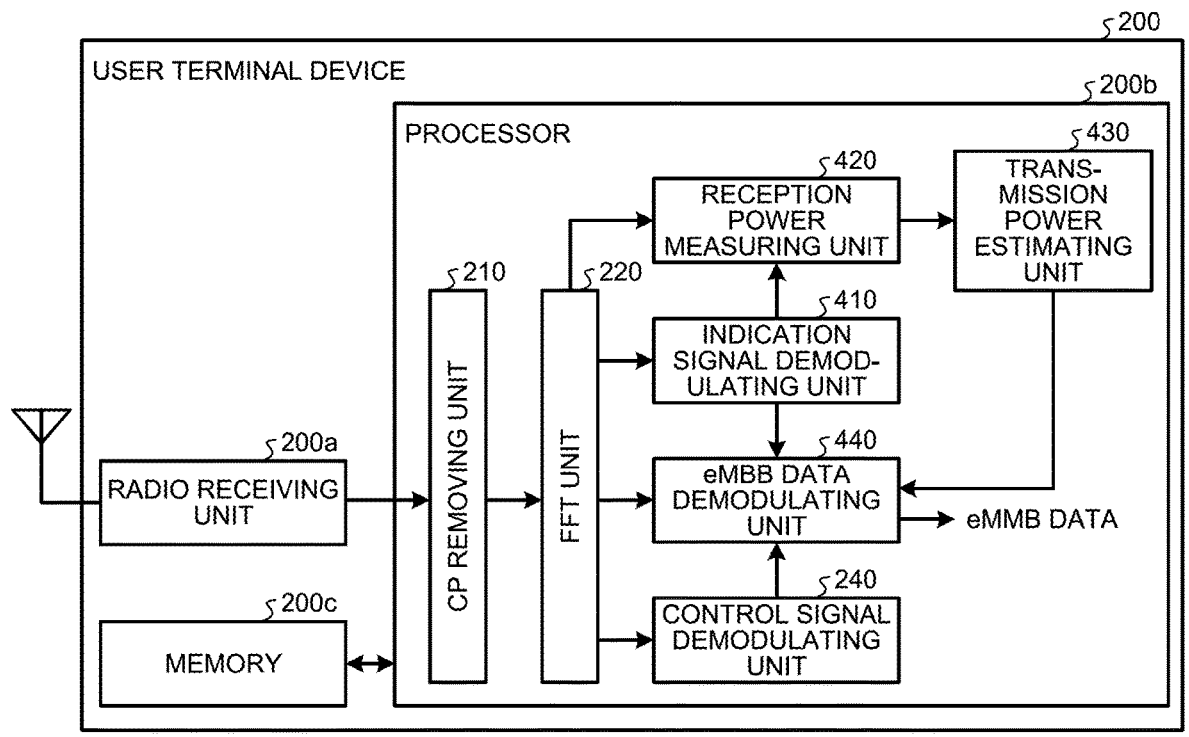
FIG. 11 is a block diagram illustrating a configuration of a user terminal device according to the second embodiment.

FIG. 11 is a block diagram illustrating a configuration of the user terminal device 200 according to the second embodiment. FIG. 11, components having the same configuration as those illustrated in FIG. 5 are assigned the same reference numerals and descriptions thereof in detail will be omitted. The user terminal device 200 illustrated in FIG. 11 is a user terminal device that uses a service related to eMBB and includes, similarly to the user terminal device 200 illustrated in FIG. 5, the radio receiving unit 200a, the processor 200b, and the memory 200c. However, the processor 200b in the user terminal device 200 illustrated in FIG. 11 has a configuration in which, instead of the indication signal demodulating unit 230 and the eMBB data demodulating unit 250 illustrated in FIG. 5, an indication signal demodulating unit 410 and an eMBB data demodulating unit 440 are included and a reception power measuring unit 420 and a transmission power estimating unit 430 are added.

The indication signal demodulating unit 410 demodulates the indication signal arranged in an URLLC area in a reception signal. Namely, because the position of the indication signal in each of the URLLC area and the URLLC area is already known, the indication signal demodulating unit 410 demodulates the indication signal in each of the URLLC areas. Consequently, the indication signal demodulating unit 410 grasps whether the URLLC data is included in each of the URLLC areas. Then, the URLLC data is included in the URLLC area, the indication signal demodulating unit 410 notifies the reception power measuring unit 420 and the eMBB data demodulating unit 440 of this state.

If the reception power measuring unit 420 receives the notification indicating that the URLLC data is included in the URLLC area from the indication signal demodulating unit 410, the reception power measuring unit 420 measures the reception power for each subcarrier in the URLLC area in the reception signal.

The transmission power estimating unit 430 estimates the transmission power for each subcarrier based on the reception power for each subcarrier measured by the reception power measuring unit 420. Specifically, the transmission power estimating unit 430 estimates, for example, the propagation loss between the base station device 100 and the user terminal device 200 by using the reference signal and estimates the transmission power at the base station device 100 based on the reception power and the propagation loss.

The eMBB data demodulating unit 440 demodulates the eMBB data arranged in the eMBB data area in the reception signal. At this time, if the eMBB data demodulating unit 440 receives a notification indicating that the URLLC data is included in the URLLC area from the indication signal demodulating unit 410, the eMBB data demodulating unit 440 specifies, based on the transmission power for each subcarrier, the subcarrier in which the eMBB data has been arranged. Namely, the eMBB data demodulating unit 440 compares the transmission power for each subcarrier estimated by the transmission power estimating unit 430 with a predetermined threshold. Then, the eMBB data demodulating unit 440 specifies that the URLLC data has been arranged in the subcarriers in each of which the transmission power is equal to or greater than the predetermined threshold and specifies that the eMBB data has been arranged in the subcarriers in each of which the transmission power is less than the predetermined threshold. Consequently, the eMBB data demodulation unit 440 specifies the resource in which the eMBB data is arranged in the entire eMBB data area that includes the URLLC area, and demodulates the eMBB data addressed to the own device based on the demodulation result of the control signal.

Figure 12:
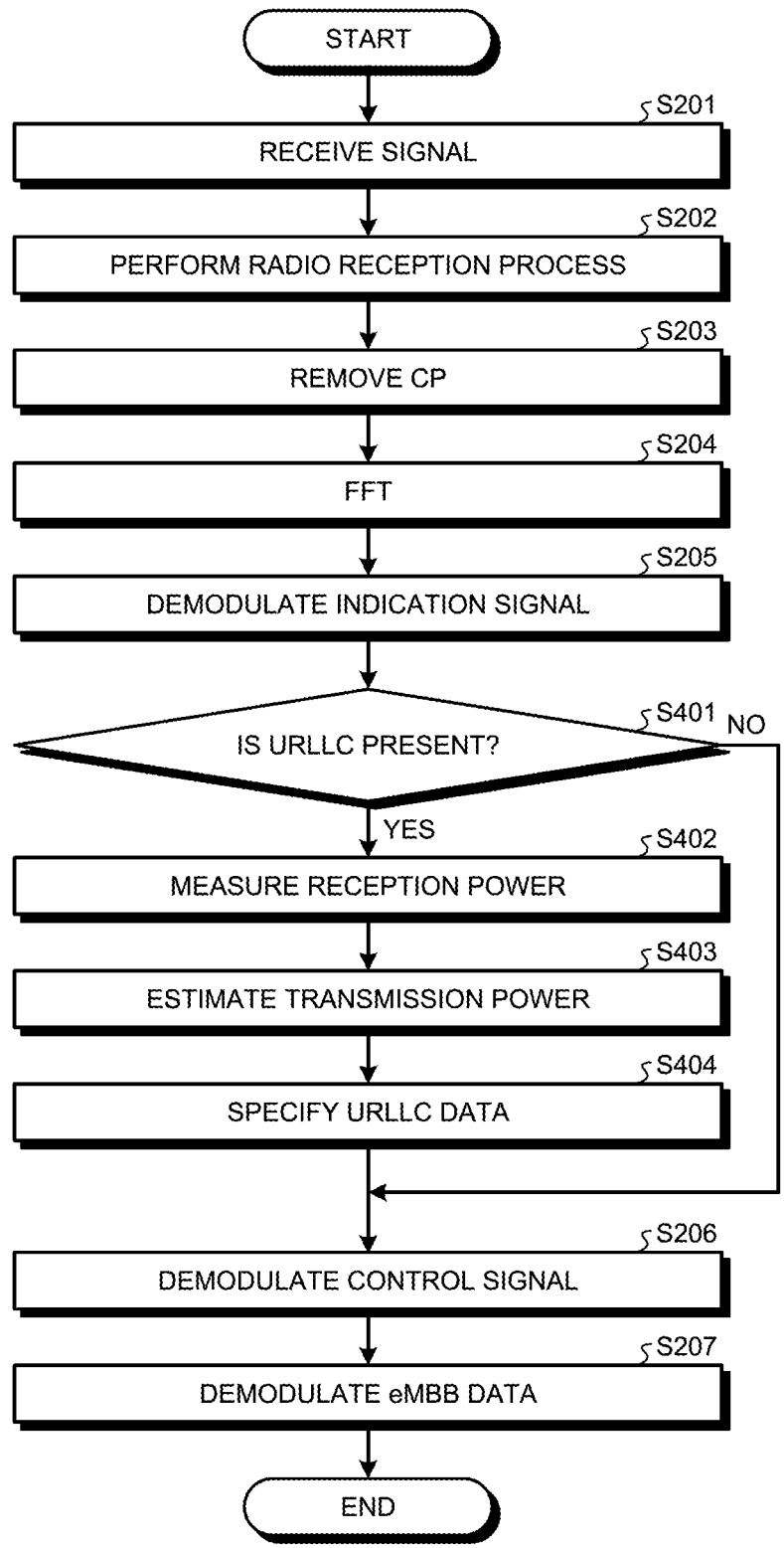
FIG. 12 is a flowchart illustrating a reception process according to the second embodiment.

In the following, a reception process performed by the user terminal device 200 related to eMBB having the configuration described above will be described with reference to the flowchart illustrated in FIG. 12. In FIG. 12, the same processes as those illustrated in FIG. 6 are assigned the same reference numerals and descriptions thereof in detail will be omitted.

Regarding the signal transmitted from the base station device 100, a reception signal in the frequency domain is obtained from the antenna via the radio receiving unit 200a, the CP removing unit 210, and the FFT unit 220 (Step S201~S204). Then, the indication signal arranged in the URLLC area in the reception signal is demodulated by the indication signal demodulating unit 410 (Step S205) and it is determined whether the URLLC data is included in the URLLC area (Step S401).

If the URLLC data is included in the URLLC area (Yes at Step S401), the reception power for each subcarrier in the URLLC area is measured by the reception power measuring unit 420 (Step S402). Then, the transmission power for each subcarrier is estimated from the reception power for each subcarrier by the transmission power estimating unit 430 (Step S403). Namely, for example, the propagation loss between the base station device 100 and the user terminal device 200 is estimated and then the transmission power for each subcarrier in the base station device 100 is estimated by adding the electrical power having an amount corresponding to the propagation loss to the reception power.

The estimation result of the transmission power is notified to the eMBB data demodulating unit 440 and the subcarrier in which the URLLC data in the URLLC area has been arranged is specified by the eMBB data demodulating unit 440 (Step S404). Specifically, the transmission power estimated for each subcarrier is compared to the predetermined threshold by the eMBB data demodulating unit 440 and it is determined that the URLLC data has been arranged in the subcarriers in each of which the transmission power is equal to or greater than the predetermined threshold. In contrast, it is determined that the eMBB data has been arranged in the subcarriers in each of which the transmission power in the URLLC area is less than the predetermined threshold. Consequently, in also the case where the URLLC data in the URLLC area is included, the area in which the eMBB data in the eMBB data area is arranged is specified.

Then, if the area in which the eMBB data is arranged is specified, the control signal that has been arranged in the eMBB control channel area in the reception signal is demodulated by the control signal demodulating unit 240 (Step S206) and the resource allocated to the eMBB data that is addressed to the own device is specified. Furthermore, the eMBB data addressed to the own device is acquired from the reception signal and demodulated by the eMBB data demodulating unit 440 (Step S207).

Furthermore, if the URLLC data is not included in the URLLC area (No at Step S401), based on the demodulation result of the control signal, the resource allocated to the eMBB data addressed to the own device is specified from the entire eMBB data area and then the eMBB data addressed to the own device is demodulated by the eMBB data demodulating unit 440.

As described above, according to the embodiment, the URLLC area that is temporarily reserved as the area for arranging the URLLC data is provided in the eMBB data area and, if URLLC data is generated, the URLLC data is transmitted by using the resource of the URLLC area. Furthermore, in the URLLC area, the indication signal indicating whether the URLLC data is present is arranged. Consequently, if URLLC data is generated, it is possible to promptly transmit the URLLC data without delay and, if URLLC data is not generated, it is possible to transmit eMBB data by using the resource of the URLLC area. Furthermore, if URLLC data is included in the URLLC area, the user terminal device on the reception side estimates the transmission power for each subcarrier in the URLLC area and specifies, based on the transmission power, the subcarrier in which the URLLC data has been arranged. Consequently, the information for specifying the resource that is used to arrange the URLLC data does not need to be included in the indication signal and thus it is possible to reduce the size of the indication signal.

Furthermore, in the second embodiment described above, the user terminal device 200 related to URLLC has been described; however, similarly to the user terminal device 200 related to eMBB, the user terminal device 200 related to URLLC also specifies, from the transmission power for each subcarrier, the subcarrier in which the URLLC data has been arranged.

Furthermore, in each of the embodiments, a description has been given with the assumption that an indication signal is arranged in an URLLC area; however, the indication signal does not always need to be arranged in the URLLC area. Namely, if it is possible to specify the association relationship between an indication signal and an URLLC area, the indication signal may also be transmitted separated from eMBB data and URLLC data. Furthermore, the indication signal may also be transmitted by, for example, dynamic signaling, such as physical downlink control channel (PDCCH) signaling, or may also be transmitted by quasi-static signaling, such as radio resource control (RRC) signaling.

According to an aspect of an embodiment of the base station device, the terminal device, and the transmission method disclosed in the present application, an advantage is provided in that it is possible to efficiently use the resources.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
   a processor circuitry configured to generate first data, second data to be transmitted at low latency as compared to the first data and an indication signal; and
   a transmitter configured to transmit the first data, the second data and the indication signal to a terminal device, wherein
   the indication signal includes a plurality of bits and indicates whether an area included in a resource area for the first data is used for transmitting the second data, the area having a plurality of sub-areas,
   when one or more sub-areas are used for transmitting the second data, the transmitter stops transmitting the first data using the corresponding one or more sub-areas, the plurality of bits for the indication signal have a one-to-one mapping with the plurality of sub-areas to indicate that the corresponding one or more sub-areas are used for transmitting the second data, and when the one or more sub-areas are used for transmitting the first data, the transmitter transmits the first data using the corresponding one or more sub-areas, the plurality of bits for the indication signal have one-to-one mapping with the plurality of sub-areas to indicate that the corresponding one or more sub-areas are not used for transmitting the second data.

2. The base station device according to claim 1, wherein a type of the first data is different from that of the second data.

3. The base station device according to claim 1, wherein the second data is URLLC data.

4. The base station device according to claim 1, wherein the first data is eMBB data.

5. A terminal device comprising:
a receiver configured to receive, from a base station, a reception signal including first data and an indication signal that indicates whether an area included in a resource area for the first data is used for transmitting second data to be transmitted at low latency as compared to the first data, the area having a plurality of sub-areas; and
a processor circuitry configured to determine, based on the indication signal, whether the second data is included in one or more sub-areas, wherein the receiver receives the reception signal including the second data in the one or more sub-areas and the indication signal including a plurality of bits which have a one-to-one mapping with the plurality of sub-areas to indicate that the corresponding one or more sub-areas are used for transmitting the second data, when the one or more sub-areas are used for transmitting the second data, receives the reception signal including the first data in the one or more sub-areas and the indication signal including a plurality of bits which have a one-to-one mapping with the plurality of sub-areas to indicate that the corresponding one or more sub-areas are not used for transmitting the second data, when the one or more sub-areas are not used for transmitting the second data, and demodulates, based on the determination result obtained by the processor, the first data or the second data.

6. The terminal device according to claim 5, wherein a type of the first data is different from that of the second data.

7. The terminal device according to claim 5, wherein the second data is URLLC data.

8. The terminal device according to claim 5, wherein the receiver demodulates the reception signal to obtain the first data by excluding the one or more sub-areas which are used for transmitting the second data after demodulating the indication signal.

* * * * *